June 2, 1931.  P. V. SNOW  1,807,760
MOUNTING FOR ANTIGLARE DEVICES
Filed June 22, 1929  2 Sheets-Sheet 1
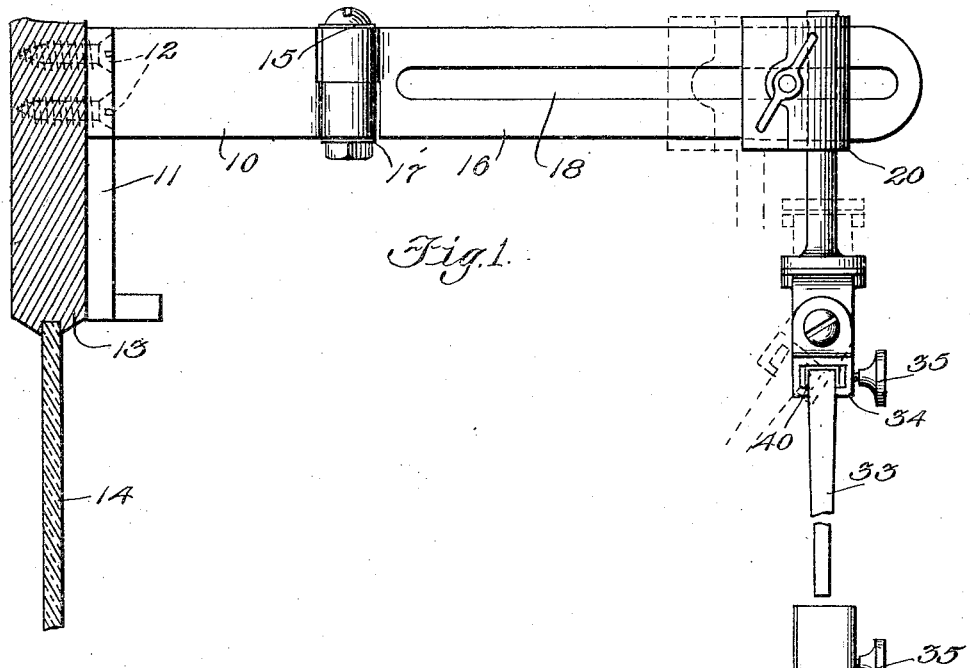
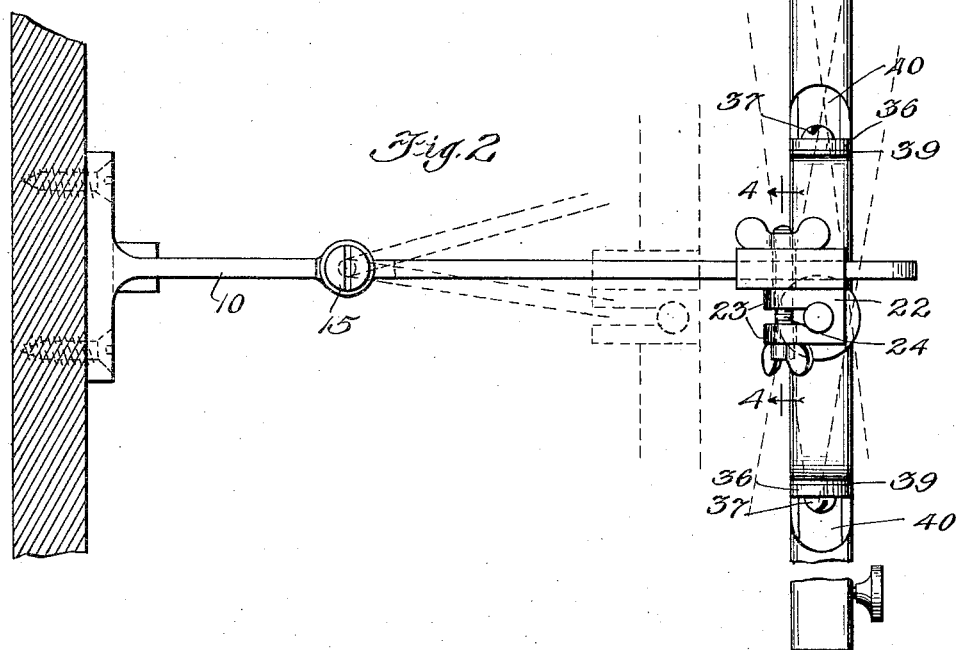
Inventor:
Philo Vernon Snow
By Maurice S. Cayne
Atty.

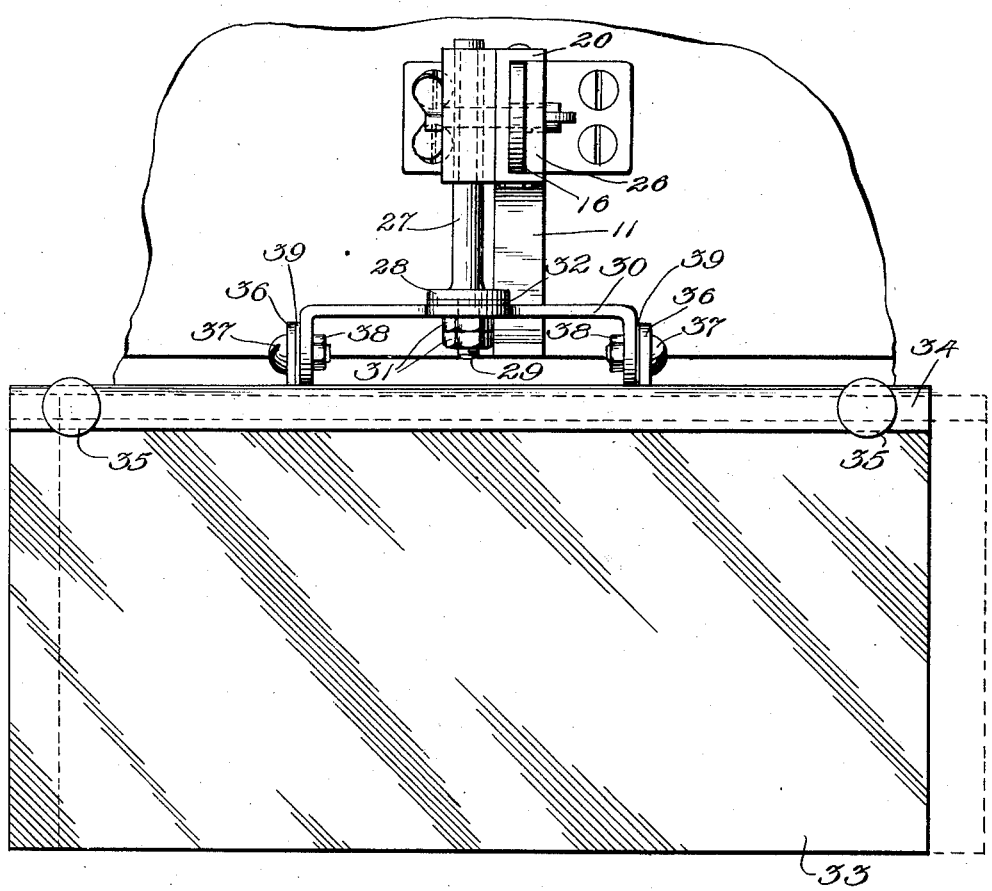
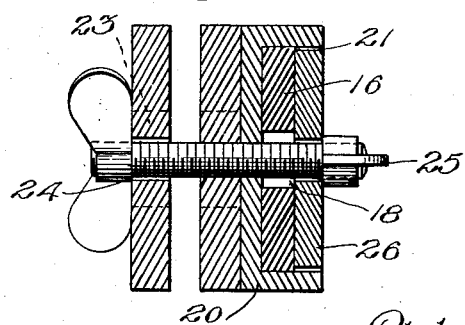

Patented June 2, 1931

1,807,760

UNITED STATES PATENT OFFICE

PHILO VERNON SNOW, OF CHICAGO, ILLINOIS

MOUNTING FOR ANTIGLARE DEVICES

Application filed June 22, 1929. Serial No. 372,945.

This invention relates to an adjustable mounting and is primarily adapted for adjustably supporting an anti-glare device for use on automobile vehicles for preventing the driver of the same from becoming temporarily blinded by a brilliant head light of an approaching car, and other source of illumination, or the rays of the sun either direct or reflected.

An object of the invention is to provide a novel and improved mounting means for an anti-glare device of the character described.

Another object of the invention is to provide a device of the character described which will be inexpensive, easily assembled, and mounted in place, highly efficient for carrying out the purposes for which it was designed, and of such a construction that it causes no interference with driving either by daylight or after dark.

The further object of the invention is to provide a device of the character described which may be readily and quickly adjusted to any desired position to suit the height and convenience of the driver.

With the foregoing and other objects in view, which will appear as the description proceeds, the invention consists of certain novel and improved features of construction, arrangement, and combination of parts hereinafter more fully described and illustrated in the accompanying drawings, and more particularly pointed out in the appended claims, it being understood that various changes in the form, proportion, size, and minor details of the structure may be made without departing from the spirit, or sacrificing, any of the advantages of the invention.

Stated generally, the invention comprises a bracket which is adapted to be permanently secured to a portion of the stationary structure of the vehicle, said bracket extending inwardly and having hinged thereto one end of a bar, whereby said bar may be swung in a horizontal plane. A longitudinal slot is provided in said bar, said slot having a member adjustably mounted therein, said member including a split sleeve through which is adapted, to extend, a vertically disposed rod, to the lower end of which is pivotally mounted a substantially inverted U-shaped bracket, adapted for rotation in a horizontal plane, and to which bracket is pivotally secured a suitable holder in which is mounted an antiglare device of colored glass, or the like. The above construction provides adjustment for the anti-glare element longitudinally, vertically, transversely, as well as providing for pivotal movement towards and away from the driver. In fact, a substantially universal adjustment may be had with this structure.

For the purpose of facilitating an understanding of my invention, I have illustrated in the accompanying drawings a preferred embodiment thereof, from an inspection of which, when considered in connection with the following description, my invention, its mode of construction, and many of its advantages, should be readily understood and appreciated.

Referring to the drawings in which similar characters of reference are employed to indicate corresponding parts throughout the several figures of the drawings:

Fig. 1 is a view in side elevation of a mounting means embodying the present invention, the same being shown secured to part of the stationary structure of the vehicle;

Fig. 2 is a top plan view of the same, the dotted lines indicating the various positions to which the same may be moved;

Fig. 3 is a front elevational view of the same;

Fig. 4 is a view taken on lines 4—4 of Fig. 2.

Referring to the drawings more specifically, the reference character 10, designates a bracket provided with a base 11 which is adapted to be attached by securing devices such as 12, to an element 13, forming a part of the stationary structure, and in which the windshield 14 is mounted. To the forward end of the bracket 10 is hinged, by means of a hinge 15, one end of a bar 16, said bar being adapted for movement in a horizontal plane with the hinge 15 as a pivot. Suitable friction washers 17 are assembled with said hinge 15, for the purpose of holding the bar or arm 16, in any desired adjusted position, some of the positions to which the said bar 16 may be moved being indicated in dotted lines in Fig. 2 of the drawings.

The bar or arm 16 is provided with a longitudinal slot 18, said slot extending along substantially the full length of said bar and is adapted for permitting the longitudinal adjustment of a carriage or bracket 20, which bracket 20, is provided with a recess or channel 21, in which is adapted to be received the arm 16, as is clearly shown in Fig. 4 of the drawings.

The carriage 20 comprises, besides the channel 21, a split sleeve member 22, provided with a pair of spaced arms 23, through which arms is adapted, to extend, a winged bolt 24, said bolt 24, extending loosely through one of said arms 23, but is in screw threaded engagement with the other of said arms 23, whereby the rotation of said bolt 24 will cause a tightening of said split sleeve member 22.

The bolt 24 is also adapted for securing in place the carriage 20 to the arm 16. This is accomplished in the following manner. The bolt 24 is also threaded through a central opening provided in the channel 21, said bolt passing through the slot 18 in the arm 16, and has provided on the end thereof a suitable winged nut 25, and a washer or plate 26, which is adapted to be loosely received on the end of the bolt 24, and to bear against one side of the arm 16, for securely locking the carriage 20 to the arm in any desired adjusted position. It will be noted that by loosening the winged nut 25, the carriage 20 may be moved longitudinally to any desired position along the length of the arm 16, and by tightening said winged nut 25, the carriage will be locked in said position.

The split sleeve 22 is adapted to receive for vertical movement therein the rod 27, said rod extending through the passage provided therefor in the split sleeve 22, and is adapted to be held in any desired adjusted position in said split sleeve by means of the bolt 24, which is adapted to securely lock said rod 27 in said sleeve. By merely loosening said bolt 24, the rod 27 may be moved to a position to suit the height of the driver.

The lower portion of the rod 27 is provided with a base 28, from which is adapted, to extend, a screw threaded stud 29, said stud extending through a central opening provided in a substantially inverted U-shaped bracket 30; said bracket being secured to said base 28 by means of the nuts 31, there being provided a suitable friction washer 32 between the base 28 and the bracket 30, whereby said bracket 30 may be rotated in a horizontal plane about the stud 29, the nuts 31 and friction washer 32 cooperating to hold said bracket in any position to which it may have been moved.

The glare shade 33 has the upper edge thereof mounted in a holder 34, said shade being secured in said holder by means of set screws 35, said holder also being provided with a pair of upstanding ears 36, by means of which said holder is pivotally secured to the depending arms of the inverted U-shaped bracket 30. Suitable bolts 37 extend through openings provided in said ears 36 and the depending arms of the bracket 30, said bolts having the nuts 38 threaded on their free ends for locking said holder to said bracket. Suitable friction washers 39 may be disposed between said ears and bracket, whereby said glare shade may be moved about its pivots 37 and held in any desired adjusted position by means of such friction washers, as shown in dotted lines in Fig. 1 of the drawings.

The glare shade 33 may be constructed of any material suitable for the purpose, such for example as colored glass, mica, celluloid, or the like, and when disposed in adjusted position it will be located between the eyes of the driver and the lights of an approaching vehicle. The glare shade will also be in position to shield the eyes of the driver from the rays of the sun, either direct or reflected, as well as from any overhead sources of illumination, such as for example, road or street lights, and the like.

If desired, the glare shield 33 may be swung about the pivots 37 to a substantially horizontal position, whereby it will be completely out of the way. Also the shade 33, which has the upper edge thereof fixedly mounted in the channel 40, may be moved to the left or right in the holder 34, as shown in Fig. 3, in dotted lines, for providing further adjustment of the shade to either side of the driver.

It will be noted that the device thus constructed is of special value in actual use, the operation being obvious, namely, that the glare shield may be moved and adjusted substantially universally to a position which will be most effective in shielding the eyes of the driver from brilliant head lights on approaching vehicles, or the glare from any other sources of illumination. It will also be noted that a transverse adjustment of the glare shield may be had by moving the arm 16 about the hinge 15, a fore and aft adjustment may be had by moving the carriage 20 in the slot 18 in the arm 16, a vertical adjustment may be had by adjusting the position of the rod 27 in the split sleeve 22, and the pivotal mounting of the bracket 30 on the member 27, as well as the pivots 37, provide for still further adjustments of the glare shade 33. Thus the construction provided may be adjusted to suit the driver's height and the position of the annoying glare, and is adapted to meet the requirements of various drivers under substantially all conditions.

It is believed that my invention, its mode of construction, and many of its advantages, should be readily understood from the foregoing, without further description, and should also be manifest that while a preferred embodiment of the invention has been shown and described for illustrated purposes, the structural details are, nevertheless, capable of wide variation within the purview of my invention as defined in the appended claims.

What I claim and desire to secure by Letters Patent of the United States is:—

1. In a device of the character described, a bracket arranged for attachment to a fixed support, an arm pivotally connected to the bracket, a carriage mounted for longitudinal movement on the arm, a split sleeve carried by the carriage and provided with a vertically disposed bore, a rod adjustably mounted in said bore in a substantially vertical position, means for securing the carriage and rod in adjusted positions independently of each other, a second bracket mounted on the rod for pivotal movement about the axis of the rod, means for adjusting the second mentioned bracket to any desired angular position about its axis without disturbing the adjustment of the rod or the carriage, and a glare screen mounted in said bracket.

2. In a device of the character described, a bracket arranged for attachment to a fixed support, an arm pivotally connected to the bracket, a carriage mounted for longitudinal movement on the arm, a split sleeve carried by the carriage and provided with a vertically disposed bore, a rod adjustably mounted in said bore in a substantially vertical position, means for securing the carriage and rod in adjusted positions independently of each other, a second bracket mounted upon the rod and swiveled for adjustment coaxially of the rod, and a glare screen pivotally mounted in said bracket and adjustable about an axis transverse to that of the bracket.

In testimony whereof I affix my signature.

PHILO VERNON SNOW.